US006254023B1

(12) United States Patent
Mochizuki et al.

(10) Patent No.: US 6,254,023 B1
(45) Date of Patent: Jul. 3, 2001

(54) PHOTO FILM CASSETTE

(75) Inventors: Tadashi Mochizuki; Seiichi Watanabe; Keiji Shigesada; Naoyoshi Chino; Masahiro Enomoto; Mototada Yasui; Akira Tomita, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/420,584

(22) Filed: Oct. 19, 1999

Related U.S. Application Data

(62) Division of application No. 09/133,817, filed on Aug. 13, 1998, now Pat. No. 6,065,702.

(30) Foreign Application Priority Data

Aug. 19, 1997 (JP) .................................................. 9-222429

(51) Int. Cl.[7] .................................................. G03B 23/02
(52) U.S. Cl. .................................. 242/348.4; 242/610.6; 242/614; 396/512
(58) Field of Search .............................. 242/348.4, 610.4, 242/610.6, 614; 396/512, 516

(56) References Cited

U.S. PATENT DOCUMENTS

| 4,848,693 | 7/1989 | Robertson . |
|---|---|---|
| 5,083,155 | 1/1992 | Kataoka et al. . |
| 5,151,730 | 9/1992 | Kemp et al. . |
| 5,211,348 | 5/1993 | Enomoto . |
| 5,282,585 | 2/1994 | Takatori . |
| 5,296,887 | 3/1994 | Zander . |
| 5,833,160 | 11/1998 | Enomoto . |

FOREIGN PATENT DOCUMENTS 6-148808    5/1994  (JP) .

*Primary Examiner*—John Q. Nguyen
(74) *Attorney, Agent, or Firm*—Sughrue, Mion, Zinn, Macpeak & Seas, PLLC

(57) ABSTRACT

A photo film cassette has a spool core about which photo film is wound in a form of a roll. A cassette shell contains the spool core in a rotatable manner. Two flanges have a disk shape, and are secured to respective ends of the spool core, for regulating lateral edges of the roll of the photo film. A circumferential lip is disposed on each flange, is extended toward the opposite one of the flanges, wraps one of the lateral edges of an outermost turn of the photo film of the roll, and prevents the photo film from being loosened. A rim portion is disposed on an circular edge of the circumferential lip confronted with the opposite one of the flanges, to project with a bend away from the spool core. A contact face is disposed on the rim portion, and contacts the one of the lateral edges of the photo film when the photo film is unwound from the spool core or wound back about the spool core. The contact face has a contact range of 0.15–0.8 mm in contacting the one of the lateral edges of the photo film.

7 Claims, 14 Drawing Sheets

F I G. 12A
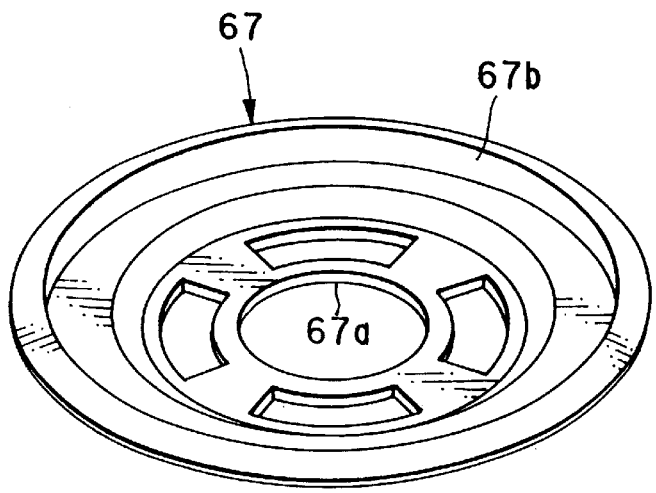
F I G. 12B
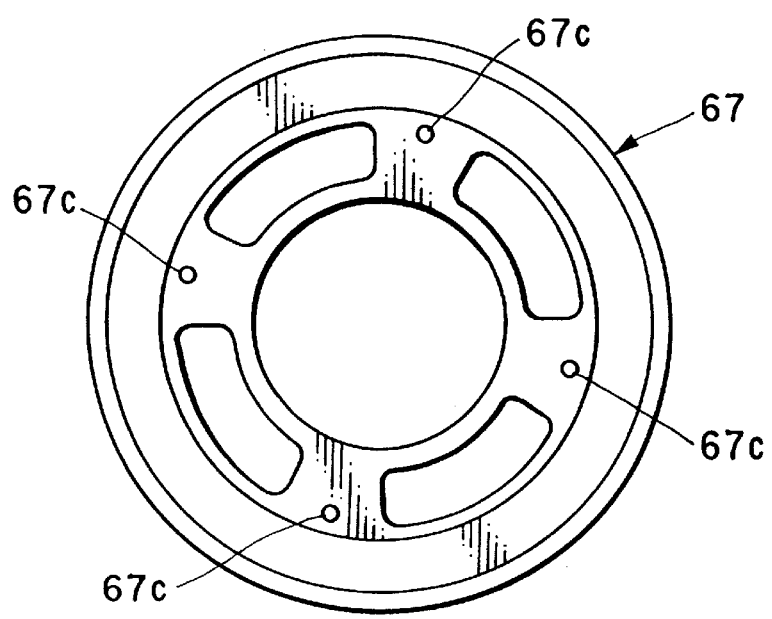

PHOTO FILM CASSETTE

This is a divisional of U.S. application Ser. No. 09/133,817 filed Aug. 13, 1998 U.S. Pat. Ser. No. 6,065,702, the disclosure of which is incorporated herein by reference.

BACKGROUND OF THE INVENTION

1. Field of the Invention

The present invention relates to a photo film cassette. More particularly, the present invention relates to a photo film cassette of a type in which rotation of a spool advances a leader of photo film to the outside, and which includes improved flanges of the spool.

2. Description Related to the Prior Art

There are various documents U.S. Pat. No. 5,296,887, JP-A 2-18545 (corresponding to U.S. Pat. No. 4,848,693) and JP-A 4-320258 (corresponding to U.S. Ser. No. 655,944) which suggest a photo film cassette in which a cassette shell consists of molded parts of resin, and rotation of a spool core causes a leader of photo film to advance to the outside of the cassette shell. U.S. Pat. No. 5,083,155 (corresponding to JP-A 3-179341) suggests a container for containing developed photo film, the container including the cassette shell of the same structure for the purpose of facilitating handling and preservation of the developed photo film.

The photo film cassette includes a pair of flanges, which are disposed on respective axial ends of the spool core. There are circumferential lips formed on the respective periphery of the spool flanges to transmit rotation of the spool core reliably to the roll of the photo film. The circumferential lips partially wrap lateral edges of the outermost turn of the photo film to prevent the photo film from being loosened. In the course of advance and rewinding of the photo film, rigidity of the photo film causes the spool flanges to flex. Therefore the circumferential lips squeeze the lateral edges of the photo film between them.

In the course of advance of the photo film, the spool flanges must be spread by the photo film in the vicinity of the photo film passageway, in order to release the photo film from being partially wrapped by the circumferential lips. The spool flanges rotate always with deformation, and thus are originally formed with a small thickness. On the other hand, the spool flanges require sufficient rigidity, resistance to abrasion and other conditioned characteristics. Typically the circumferential lips must have considerable rigidity and resistance to abrasion for the reason of frictional contact with the lateral edges of the photo film in the course of the advance and rewinding of the photo film.

To provide the spool flanges with sufficient rigidity and resistance to abrasion, appropriate material for forming the spool flanges should be selected. Also an appropriate molding method for the spool flanges must be used. For example, documents such as U.S. Pat. No. 5,211,348 (corresponding to JP-A 4-251841), JP-A 6-148808 and U.S. Ser.No. 531,966 (corresponding to JP-A 8-146562) suggest a flange forming method. A polyethylene resin sheet is formed by extrusion with a thickness of 0.3 mm, and then heated and softened. Flange-shaped portions are formed by vacuum forming or pressure sure forming of the resin sheet, and then punched to obtain the spool flanges.

No matter whether good the material is to be used for the spool flanges in view of the rigidity and resistance to abrasion, the edge of the circumferential lips of the spool flanges of the prior art, having a rounded shape, still contacts the lateral edges of the photo film frictionally at one point. There remains possibility in rubbing the circumferential lips to create scraped powder or dust.

When the scraped powder or dust is created inside a camera, it is likely to be stuck on the photo film in exposure regions to lower photographic quality. The photo film according to the IX 240 type (Advanced Photo System, trade mark) is also provided with magnetic recording layer. The scraped powder or dust in the camera is likely to deposit on a magnetic head to cause failure in properly writing data to, or reading data from, the magnetic recording layer.

SUMMARY OF THE INVENTION

In view of the foregoing problems, an object of the present invention is to provide a photo film cassette of a type in which rotation of a spool advances a leader of photo film to the outside, and in which the circumferential lips of the spool flanges are prevented from being frictionally rubbed by the photo film.

Another object of the present invention is to provide a photo film cassette having flanges of which supply and conveyance are prevented from being influenced by occurrence of electrostatic charge between flanges, and between a flange and a part feeder which conveys the flange.

Still another object of the present invention is to provide a photo film cassette of which flanges can be molded consecutively one after another at remarkably higher speed.

In order to achieve the above and other objects and advantages of this invention, a photo film cassette includes a spool core about which photo film is wound in a form of a roll, a cassette shell for containing the spool core in a rotatable manner, first and second flanges, having a disk shape, and secured to respective ends of the spool core, for regulating lateral edges of the roll of the photo film, a circumferential lip, disposed at least on the first flange, extended toward the second flange, for wrapping one of the lateral edges of an outermost turn of the photo film of the roll, to prevent the photo film from being loosened. A rim portion is disposed on an circular edge of the circumferential lip confronted with the second flange, to project with a bend away from the spool core. A contact face is disposed on the rim portion, for contacting the one of the lateral edges of the photo film when the photo film is unwound from the spool core or wound back about the spool core, the contact face having a contact range of 0.15–0.8 mm in contacting the one of the lateral edges of the photo film.

In a preferred embodiment, the contact face is inclined away from the spool core in a projecting direction of the rim portion, for reducing resistance of the circumferential lip against the photo film when the photo film is unwound from the spool core or wound back about the spool core.

The contact face is an at least partially conical surface.

The contact range is obtained by drawing the photo film out of the cassette shell for inspection, embedding an inside of the cassette shell with test resin, hardening the test resin, further drawing the photo film out of the cassette shell, polishing the test resin, and when a surface of the photo film appears by polishing the test resin, measuring a range where the photo film appears.

Furthermore, a photo film passageway is formed in the cassette shell, and adapted to advance and rewinding of the photo film therethrough. A separator claw is disposed in the cassette shell, for separating the outermost turn of the photo film from the roll when the spool core is rotated in an unwinding direction while an entirety of the photo film is contained in the cassette shell, to direct the outermost turn to the photo film passageway.

Consequently the circumferential lips of the spool flanges are prevented from being frictionally rubbed by the photo film.

In another preferred embodiment, the first and/or second flange includes one bottom face being substantially flat. At least one support projection, disposed to project from the bottom face, directed downwards when conveyed and supplied, for supporting the bottom face, to reduce an area where the bottom face is contacted externally.

The bottom face is positioned opposite to the roll of the photo film.

The first and/or second flange is formed from resin, has a weight of 0.5 gram or less, and has an average thickness of 0.4 mm or less.

The at least one support projection is semi-spherical or conical.

Consequently supply and conveyance of flanges are prevented from being influenced by occurrence of electrostatic charge between flanges, as the contacting area is reduced.

In a further preferred embodiment, the circumferential lip has an inner surface confronted with the roll of the photo film. At least one ridge is disposed to project from the inner surface.

The circumferential lip further has an outer surface positioned opposite to the roll of the photo film. The first flange is molded from resin. During molding of the first flange, the at least one ridge sets a release of the inner surface later than a release of the outer surface.

The at least one ridge is arc-shaped as viewed in section, and extends in a circular direction of the inner surface.

A projecting height of the at least one ridge is 0.005–0.10 mm.

Consequently efficiency in the release of the molded flange from the mold is raised. The flanges can be molded consecutively one after another at remarkably higher speed.

BRIEF DESCRIPTION OF THE DRAWINGS

The above objects and advantages of the present invention will become more apparent from the following detailed description when read in connection with the accompanying drawings, in which:

FIG. 12A is a perspective illustrating a flange opposite to that of FIG. 11A;

FIG. 12B is a plan illustrating the flange of FIG. 12A;

DETAILED DESCRIPTION OF THE PREFERRED EMBODIMENTS OF THE PRESENT INVENTION

Figure 1:
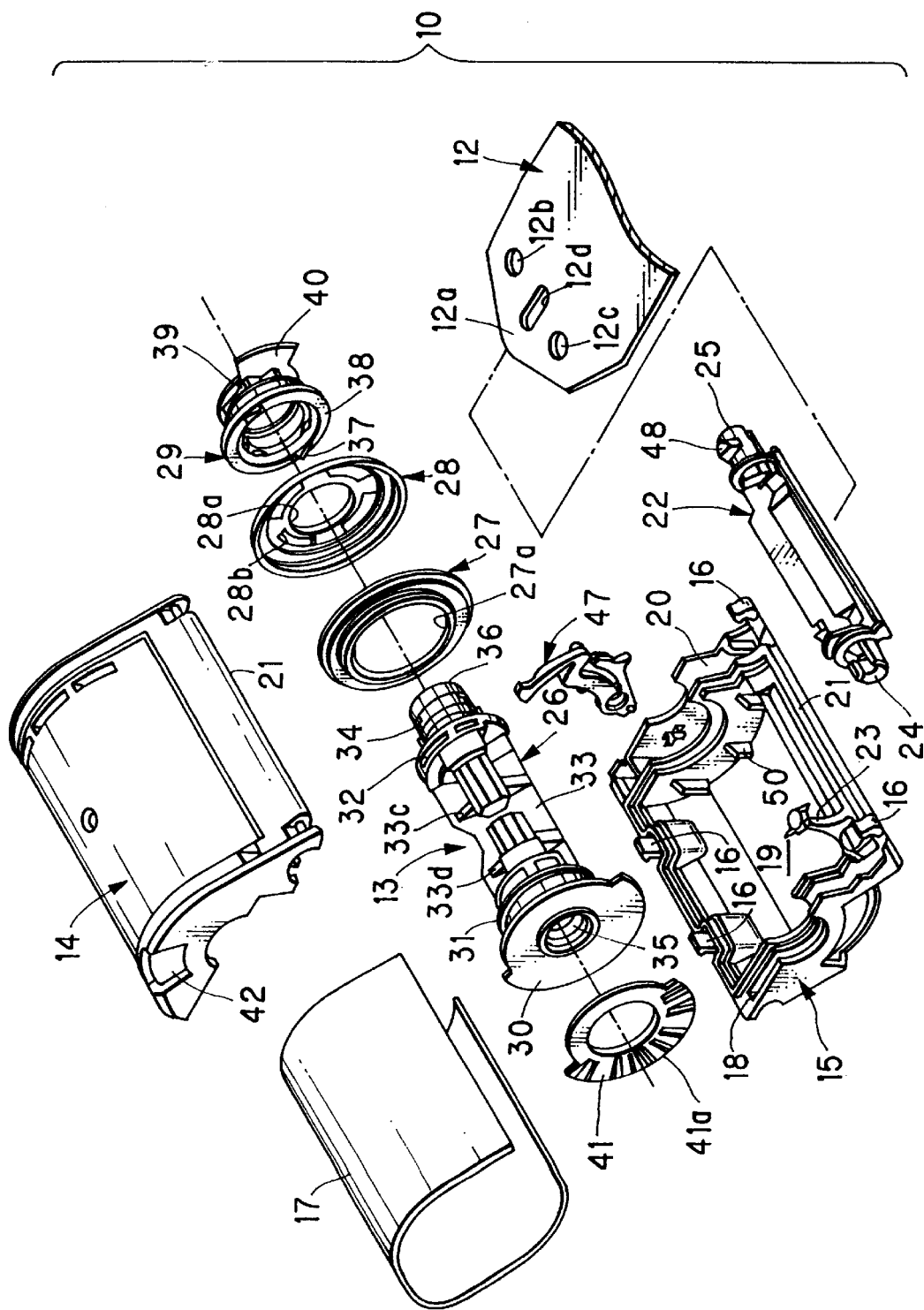
FIG. 1 is an exploded perspective illustrating photo film cassette.

In FIG. 1, a photo film cassette 10 includes a cassette shell 11, which contains a spool 13 in a rotatable manner with photo film 12 wound thereabout in a roll form. When the spool 13 is rotated in a direction to unwind the photo film 12, a leader of the photo film 12 is exited to the outside of the cassette shell 11.

The cassette shell 11 is constituted by shell halves 14 and 15 each of which is a molded part of resin. The shell half 15 has retainer hooks 16, which are retained on the shell half 14, to secure the shell half 15 to the shell half 14 in a fixed manner. A label or sticker 17 is attached to the outside of the cassette shell 11.

The inside of the cassette shell 11 are divided into three, including an information chamber 18, a photo film chamber 19 and an indicator chamber 20. There is a photo film passageway 21 formed along a portion of the juncture between the shell halves 14 and 15. The photo film passageway 21 has a cassette shutter 22 and a separator claw 23. The cassette shutter 22 is openable, and when closed, prevents ambient light from entry into the cassette shell 11. The separator claw 23 is disposed in the cassette shell 11, and separates the leader of the spool 13 from the roll. Respective ends of the cassette shutter 22 has keys 24 and 25. When a camera is loaded with the photo film cassette 10, one of the keys 24 and 25 is connected with an opener drive shaft. When the drive shaft is rotated, the cassette shutter 22 is set at one of open and closed positions for the photo film passageway 21.

The spool 13 includes a spool core 26, a pair of flanges 27 and 28 and a barrel member 29, each of which is a molded part of resin. The spool core 26 is a one piece including a data plate 30, receiver portions 31 and 32, a slit 33, a barrel receiver 34 and keys 35 and 36. The receiver portions 31 and 32 is used for receiving the respective flanges. The slit 33 is formed for retention of a trailer of the photo film. When a camera is loaded with the photo film cassette 10, one of the keys 35 and 36 is engaged with a drive shaft of the camera, which causes the spool core 26 to rotate.

The slit 33 has push ridges 33a and 33b and retainer claws 33c and 33d. The push ridges 33a and 33b have resiliency. The retainer claws 33c and 33d are engaged with respective retainer holes 12b and 12c formed in a trailer 12a of the photo film 12. A slot 12d is formed between the retainer holes 12b and 12c, and receives both the push ridges 33a and 33b. The push ridges 33a and 33b retain the trailer 12a of the photo film 12 and keep the retainer claws 33c and 33d from moving away from the retainer holes 12b and 12c. After the trailer 12a is retained on the spool core 26, the photo film 12 is wound about the spool core 26.

The barrel member 29 is one piece including a disk 38, a gear 39 and an indicator plate 40. The disk 38 has ratchet claws 37. All those portions of the barrel member 29 is rotatable together with the spool core 26.

When the spool 13 with the roll of the photo film 12 is inserted in the cassette shell 11, the flanges 27 and 28 are contained in the photo film chamber 19 with the photo film 12. The data plate 30 is contained in the information chamber 18. The indicator plate 40 and the gear 39 are contained in the indicator chamber 20.

Figure 2:
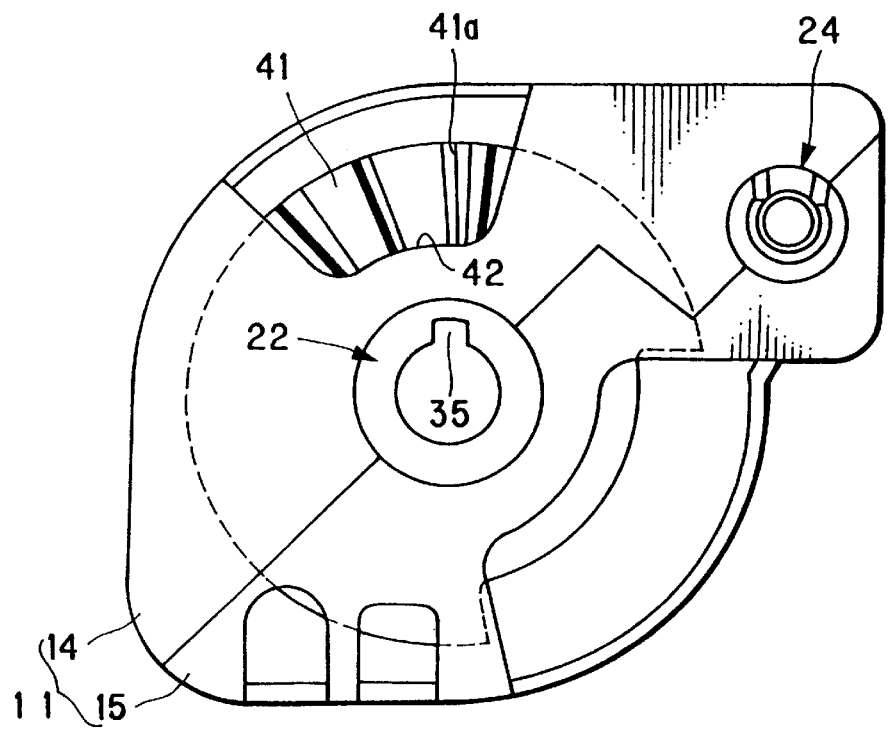
FIG. 2 is a side elevation illustrating the photo film cassette.

A label or sticker 41 is attached to the data plate 30, and has a bar code 41a printed thereon. The bar code 41a represents information of the photo film sensitivity, the number of available frames, the photo film type, and the like. The bar code 41a, when the photo film cassette is loaded in a camera or a photographic printer, is read by a bar code reader or sensor in it. The shell half 14, as illustrated in FIG. 2, has a reader opening 42, through which the bar code 41a is accessed and read while the spool 13 is rotated in the unwinding direction. Note that the bar code 41a may be directly printed on the data plate 30 by pad printing or hot stamping, that is the foil stamping, without the use of the sticker 41. Also a bar code label with the bar code 41a may be provided by thermal transfer in the course of molding the spool core 26 instead of the pad printing or hot stamping.

Figure 3:
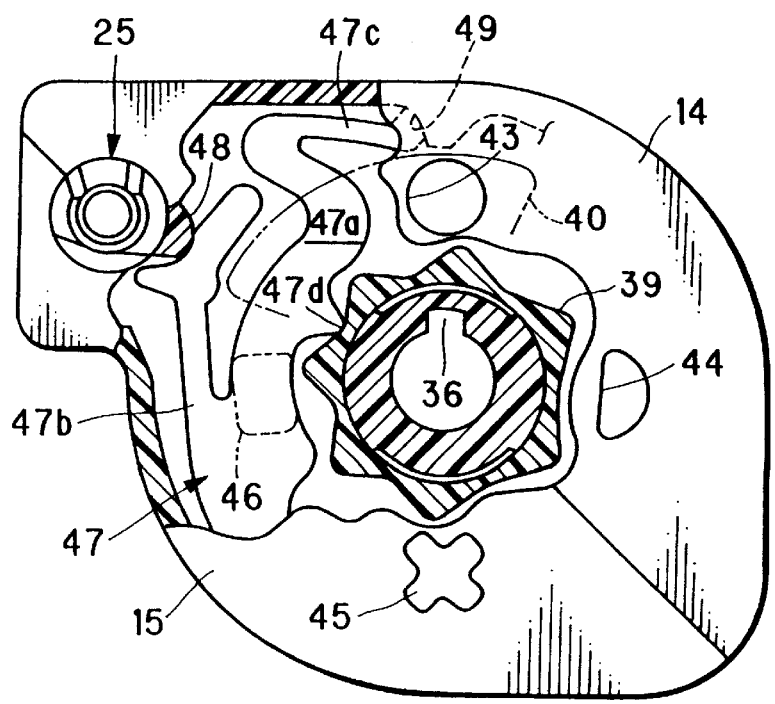
FIG. 3 is a side elevation opposite to FIG. 2, illustrating the photo film cassette.

The indicator plate 40 is used for indicating one of used statuses of the photo film 12 inside the cassette shell 11, the used statuses including an unexposed status, an exposed undeveloped status, and a developed status. The indicator plate 40, as depicted in FIG. 3, is positioned on the rear of one of indicator windows 43, 44, 45 and 46 formed in an outer wall of the indicator chamber 20. Each of the indicator windows 43, 44, 45 and 46 is associated with one of the used statuses, and pointed by the indicator plate 40 to signal the information in a visually recognizable manner.

A spool lock 47 is contained in the indicator chamber 20 for meshing with the gear 39. The spool lock 47 allows the spool 13 to rotate when the cassette shutter 22 is in the open position, and blocks rotation of the spool 13 when the cassette shutter 22 is in the closed position. In FIG. 3, the spool lock 47 includes a main arm 47a and end arms 47b and 47c, which are extended from the main arm 47a in a resilient manner. An engaging claw 47d is disposed at the center of the main arm 47a.

When the cassette shutter 22 is in the closed position, the end arm 47b contacts a key 48. Thus the engaging claw 47d is pressed against the gear 39, and kept in mesh with the gear 39 to stop the spool 13 from rotating. The photo film cassette 10 being unused has the cassette shutter 22 in the closed position. The spool 13 does not rotate.

The end arm 47c contacts an engaging projection 49 disposed inside the indicator chamber 20, and biases the main arm 47a in a direction of disengaging the engaging claw 47d from the gear 39. When the cassette shutter 22 is in the open position, the key 48 is released from pushing the end arm 47b. Then the end arm 47c disengages the engaging claw 47d from the gear 39, so that the spool 13 becomes free. The opener drive shaft of the camera causes the cassette shutter 22 to rotate to the open position. The spool 13 is allowed to rotate. Then the photo film is advanced or rewound.

Figure 4:
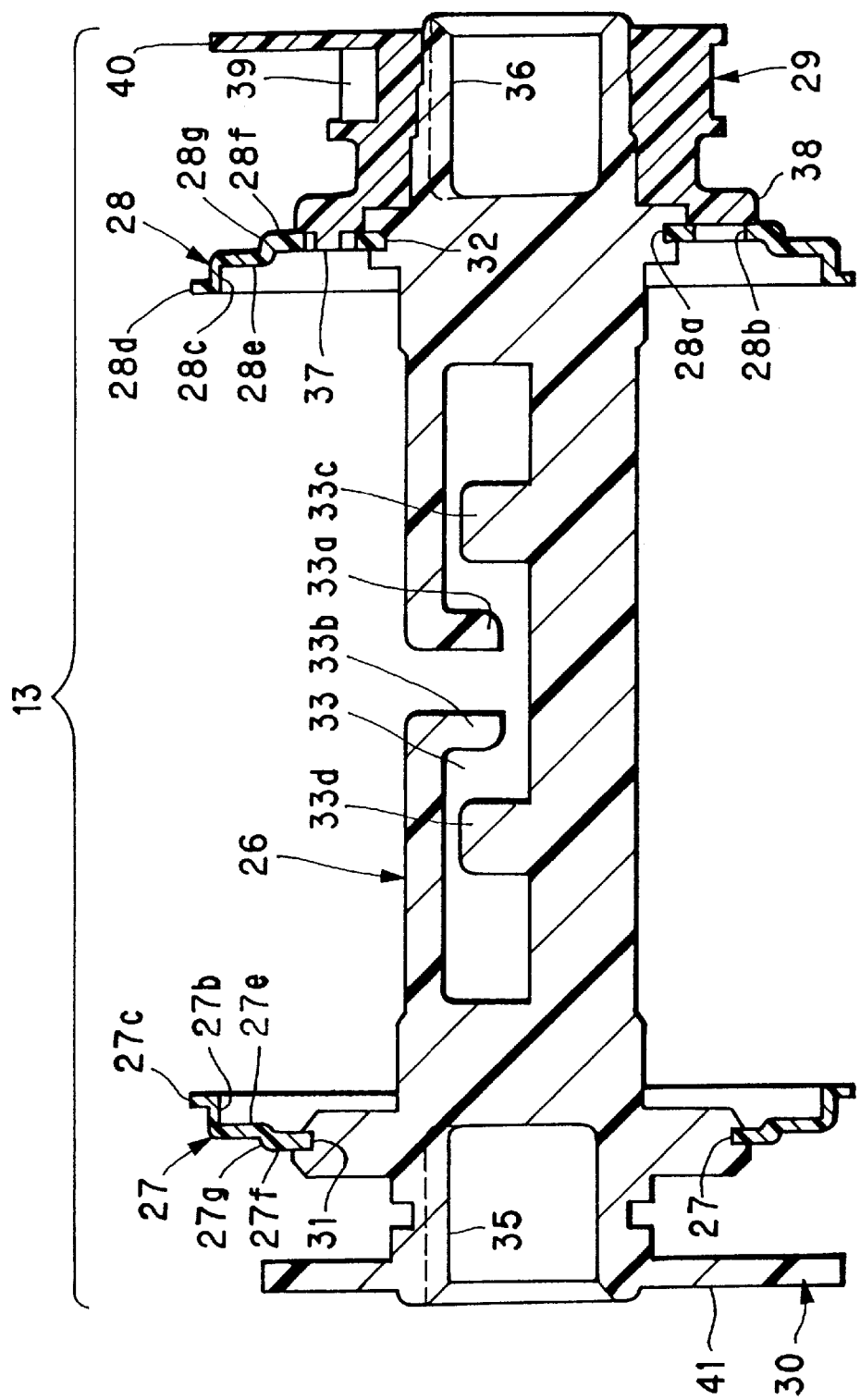
FIG. 4 is a horizontal section illustrating a spool.
Figure 6:
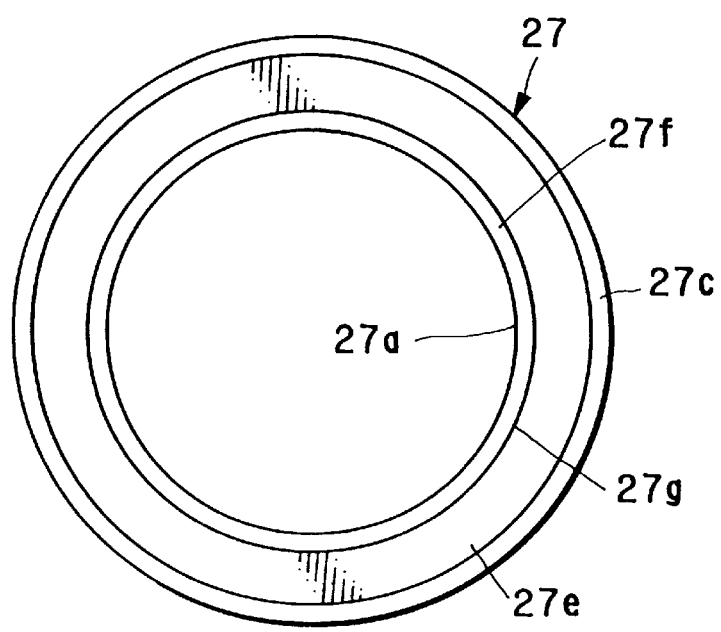
FIG. 6 is a side elevation illustrating a second flange.

In FIG. 4, the flanges 27 and 28 are secured to the receiver portions 31 and 32 between the data plate 30 and the barrel member 29 with a gap enough for a width of the photo film 12 to position it between them. In the process of assembly of parts of the spool, the flanges 27 and 28 are moved in the same direction in the insertion of the spool core 26, in consideration of ease in the assembly. The receiver portions 31 and 32 of the spool core 26 have different diameters. Also the flange 27 has a large-diameter hole 27a, and the flange 28 has a small-diameter hole 28a. The flange 27 of FIG. 6 is moved past the receiver portion 32 at first, and then reaches the receiver portion 31 to engage the large-diameter hole 27a therewith. The flange 28 is secured to engage the small-diameter hole 28a with the receiver portion 32. On either of the sides, the flanges 27 and 28 are rotatable on the receiver portions 31 and 32.

Figure 5:
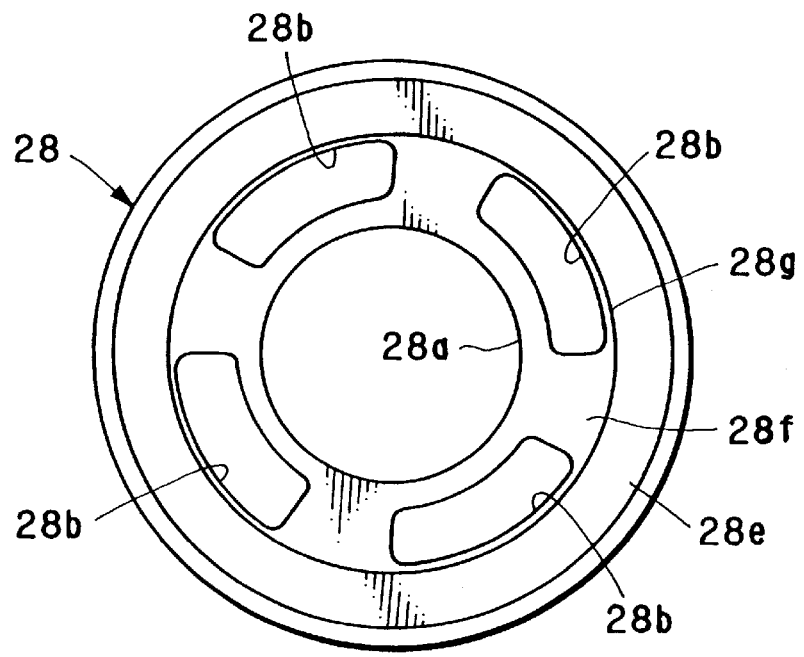
FIG. 5 is a side elevation illustrating a first flange.

In FIG. 5, the flange 28 has four holes 28b, which are arranged in a circumferential manner at a constant angular pitch. When the spool core 26 is rotated in the unwinding direction, the ratchet claws 37 of the barrel member 29 enter corresponding ones of the four holes 28b, and become engaged therewith. The ratchet claws 37, when engaged, transmit rotation of the spool core 26 to the flange 28 via the holes 28b. When in contrast the spool core 26 is rotated in the winding direction, the ratchet claws 37 are disengaged from the holes 28b, and do not transmit rotation of the spool core 26 to the flange 28.

In FIG. 4, the flanges 27 and 28 have circumferential lips 27b and 28c. When the spool core 26 rotates in the unwinding direction, the circumferential lips 27b and 28c wrap ends of the roll of the photo film 12, to transmit rotation of the spool core 26 to the outer turns of the roll, and also to keep the photo film 12 from being loosened. Again in the course of rewinding the photo film 12 about the spool core 26, the circumferential lips 27b and 28c prevent the photo film 12 from being loosened.

Figure 7A:
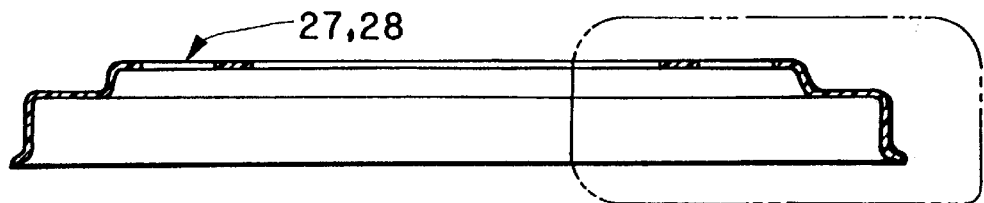
FIG. 7A is an explanatory view in cross section, illustrating each of the flanges.
Figure 7B:
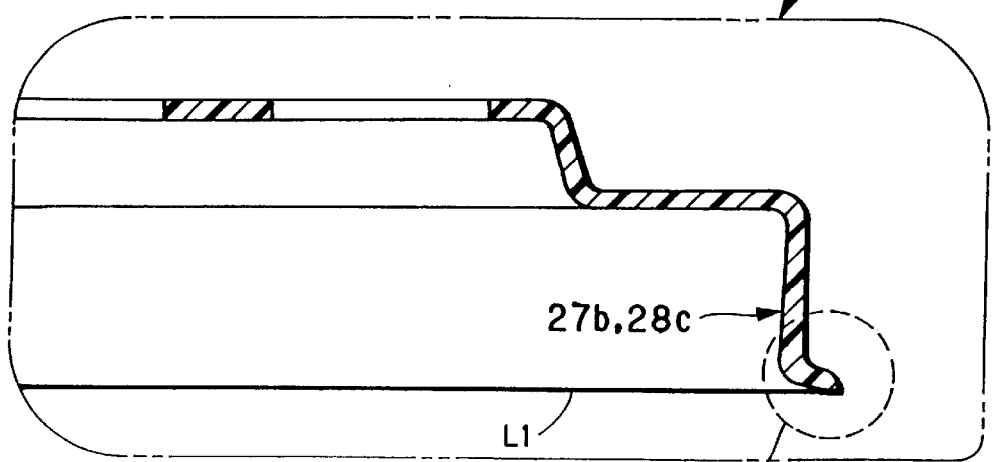
FIG. 7B is an explanatory view in enlargement, illustrating the flange with a circumferential lip.
Figure 7C:
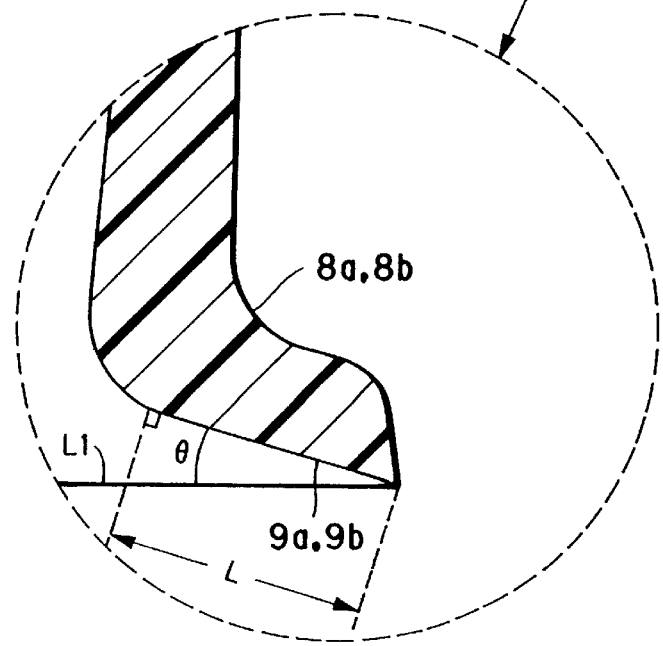
FIG. 7C is an explanatory view in enlargement, illustrating the circumferential lip with a rim portion.

In FIGS. 7A–7C, ring-shaped edges of the circumferential lips 27b and 28c of the flanges 27 and 28 are provided with rim portions 8a and 8b, which are directed outwards with respect to the shape of the flanges. Let $\theta$ be an inclination angle of the rim portions 8a and 8b with reference to a straight line L1 lying on two opposite points of each of the circumferential lips 27b and 28c and as viewed in the cross section of the flanges 27 and 28 taken in the direction of the rotational axis of the flanges 27 and 28. The inclination angle $\theta$ is preferably in a range of 5–50°, and desirably in a range of 10–35°. There are inclined contact faces 9a and 9b respectively on the rim portions 8a and 8b of the circumferential lips 27b and 28c. The inclined contact faces 9a and 9b are a curved surface of a portion of a cone, which is triangular as viewed in cross section with a straight line. Let L be a length of the inclined contact faces 9a and 9b. The length L is preferably in a range of 0.15–0.8 mm, and desirably in a range of 0.2–0.5 mm.

The circumferential lips 27b and 28c are bent with an inclination at the rim portions 8a and 8b in the range of 5–50° in a direction to spread edges of the circumferential lips 27b and 28c outwards. The inclined contact faces 9a and 9b are formed with the circumferential lips 27b and 28c in the range of 0.15–0.8 mm, to determine a considerably large area of the contact of lateral edges of the photo film 12 with the circumferential lips 27b and 28c. Accordingly the photo film 12 can contact the circumferential lips 27b and 28c in a reliably great range in the course of both advance and rewinding. Force of the push of the photo film 12 to the circumferential lips 27b and 28c per unit area is reduced. It is possible to lower an amount of scrape or abrasion of the circumferential lips 27b and 28c, and reduce an amount of plastic powder from scrape or abrasion.

When the spool core 26 is rotated in the unwinding direction, the leader of the photo film 12 comes to contact the separator claw 23, and is separated by it from the roll of the photo film 12, and is directed to the photo film passageway 21. The photo film 12 is advanced to the outside of the cassette shell 11 while spreading the circumferential lips 27b and 28c of the flanges 27 and 28. There are flange regulator ridges 50, disposed inside the photo film chamber 19, for preventing the flanges 27 and 28 from being spread outwards in regions different from the photo film passageway 21. See FIG. 1.

It is to be noted that the length L of the partial conical surface of the inclined contact faces 9a and 9b, which is straight as viewed in cross section, is obtained in approximation by experimental measurement in which epoxy resin is used.

The length L is measured by the following process. At first the photo film is kept drawn from the photo film cassette. The whole of the photo film cassette is embedded in epoxy resin without leaving bubble in the resin. The epoxy resin is hardened. After this, a surface parallel to a surface of the photo film is polished or rubbed gradually. The polishing or rubbing is stopped when the photo film surface appears. The contact length between the lip end and the photo film is measured.

Of course the length L of the partial conical surface of the inclined contact faces 9a and 9b may be measured directly, or by any suitable processes other than the above embedding process with the epoxy resin.

It is likely that a range of the inclined contact faces 9a and 9b obtained experimentally after the embedment and polish of the epoxy resin is different from an exact range of the conical surface which is straight as viewed in cross section. To be precise, the experimentally obtained range may be greater than the range of the conical surface, and may include a loosely curved section between the conical surface and the circumferential lip. In the present invention, a total contact length LC may be defined as an experimentally obtained value including a range of the loosely curved section, and can be determined to satisfy the condition of equal to or greater than 0.15 mm and equal to or smaller than 0.8 mm.

EXAMPLES

Figure 8:
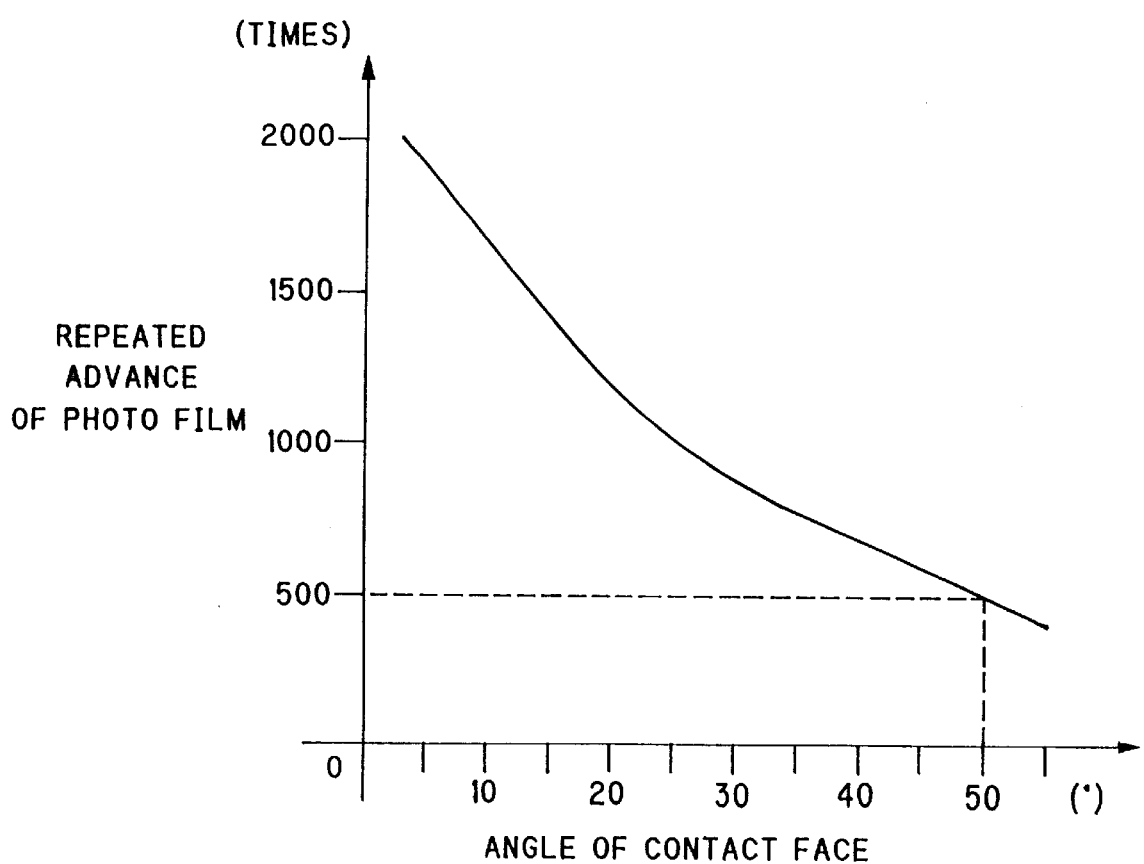
FIG. 8 is a graph illustrating a relationship between the number of times of repeated advance of the photo film and an angle of a contact face.

Examples of the photo film cassette and experiments contacted therewith are described now. FIG. 8, for results of tests on repeated advance of the photo film, illustrates a relationship between the number of times of repeated advance of the photo film and the angle of the inclined contact faces 9a and 9b of the lip. According to the graph, it is observed that the number of times of repeated advance of the photo film was decreased according to the greatness of the angle of the inclined contact faces 9a and 9b of the lip. When the repeated advance is successful for 500 or more times, there is no problem in practical performance of the photo film cassette as a product. It is concluded that a preferable range of the angle of the inclined contact faces 9a and 9b is 50° or less.

Figure 9:
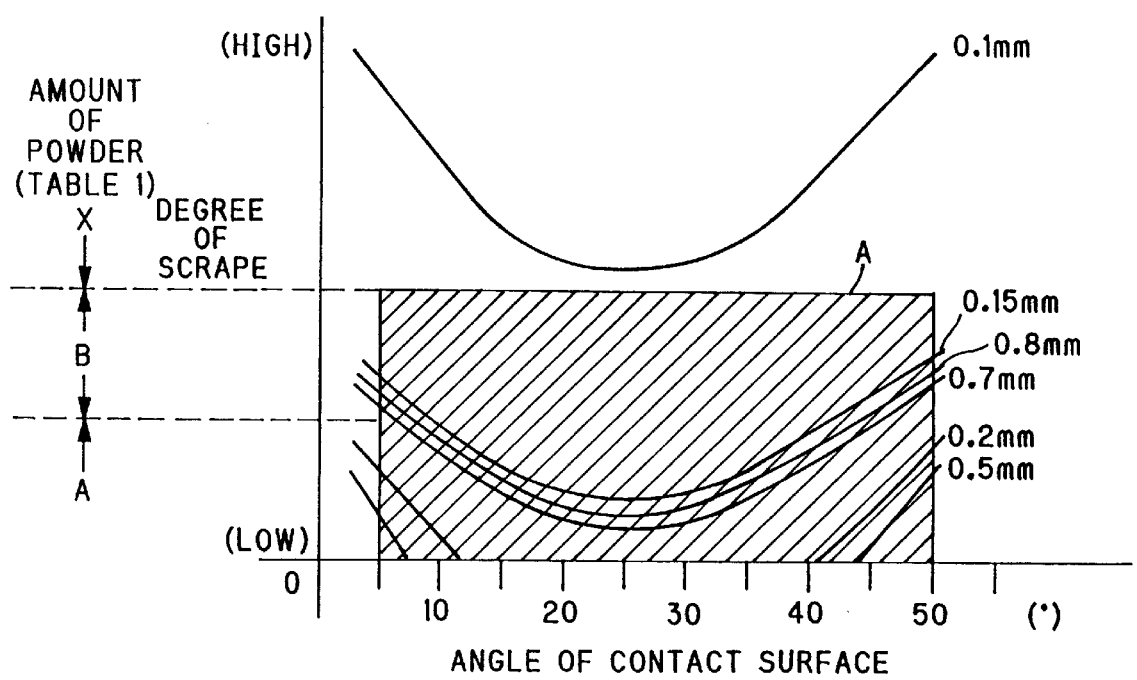
FIG. 9 is a graph illustrating a degree of scrape of the circumferential lip and the angle of the contact face.

TABLE 1 indicates the results of tests on an amount of plastic powder from scrape or abrasion of flanges inside a camera FIG. 9 is a graph plotted according to the results in TABLE 1.

TABLE 1

| Samples Nos. | Length L of inclined contact faces 9a and 9b | Angle θ of inclined contact faces 9a and 9b | Powder created in camera |
| --- | --- | --- | --- |
| 1 | 0.1 mm | 5° | X |
| 2 | 0.1 mm | 23° | X |
| 3 | 0.1 mm | 50° | X |
| 4 | 0.15mm | 5° | B |
| 5 | 0.15mm | 10° | A |
| 6 | 0.15mm | 23° | A |
| 7 | 0.15mm | 35° | A |
| 8 | 0.15mm | 50° | B |
| 9 | 0.2 mm | 5° | A |
| 10 | 0.2 mm | 10° | A |
| 11 | 0.2 mm | 23° | A |
| 12 | 0.2 mm | 35° | A |
| 13 | 0.2 mm | 50° | A |
| 14 | 0.5 mm | 5° | A |
| 15 | 0.5 mm | 10° | A |
| 16 | 0.5 mm | 23° | A |
| 17 | 0.5 mm | 35° | A |
| 18 | 0.5 mm | 50° | A |
| 19 | 0.7 mm | 5° | B |
| 20 | 0.7 mm | 10° | A |
| 21 | 0.7 mm | 23° | A |
| 22 | 0.7 mm | 35° | A |
| 23 | 0.7 mm | 50° | B |
| 24 | 0.8 mm | 5° | B |
| 25 | 0.8 mm | 10° | A |
| 26 | 0.8 mm | 23° | A |
| 27 | 0.8 mm | 35° | A |
| 28 | 0.8 mm | 50° | B |

Condition of the test. 100 test products for each of the samples were prepared by changing the length L of the inclined contact faces 9a and 9b. The samples were limited with $\theta \leq 50°$ after the tests of changing the number of the times of the repeated advance of the photo film. The samples were cleaned sufficiently, and then loaded with new photo film. Tests for taking exposures were conducted in a camera for the 100 products of the samples. Then the camera was disassembled to observe a distribution state of the scraped powder or dust inside it. The photo film used with the photo film cassette was NEXIA H (trade name, manufactured by Fuji Photo Film Co., Ltd.) of 40 exposures. Each camera was tested with the 100 products of the samples. The amount of the scraped powder was evaluated by human eyes.

Evaluation of occurrence of the scraped powder.

A: No powder was created.

B: Powder was created, but did not cause problems in practical use.

X: Much powder was created and caused problems in practical use.

In observation of those results of the experiments, it was found that problems of scraped powder of flanges were prevented from occurrence if the various conditions are satisfied within the region A hatched in the graph of FIG. 9. In the region A, the inclination angle θ of the inclined contact faces 9a and 9b is 5–50°, and desirably 10–35°. The length L of the inclined contact faces 9a and 9b is 0.15–0.8 mm, and desirably 0.2–0.5 mm.

Figure 10A:
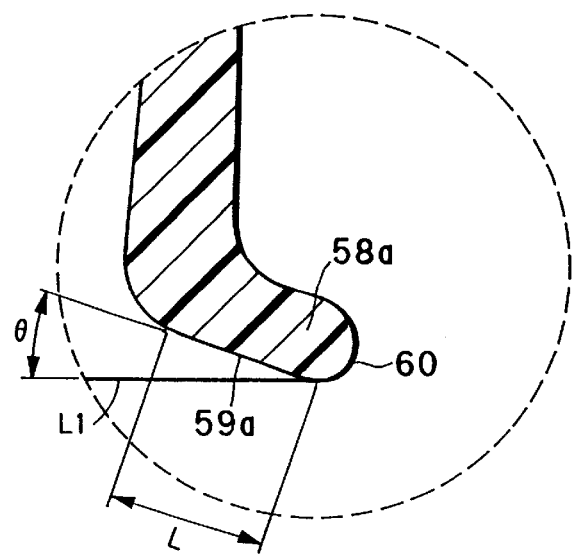
FIG. 10A is an explanatory view illustrating another preferred circumferential lip of which an edge is rounded.
Figure 10B:
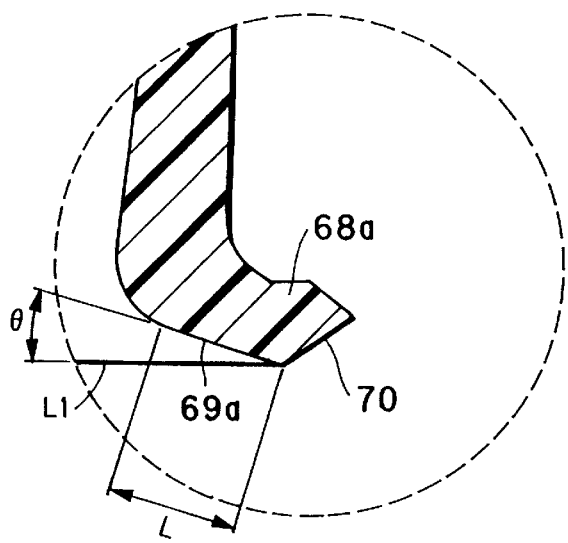
Figs. 10B and 10C are explanatory views illustrating still other preferred circumferential lips.
Figure 10C:
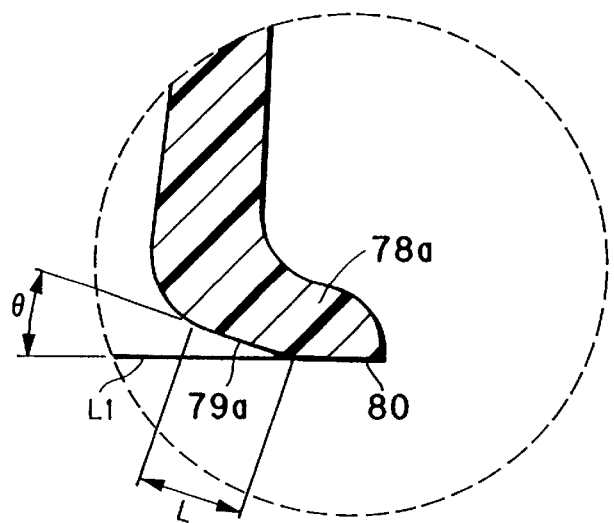

In FIGS. 10A–10C, other preferred circumferential lips are depicted. In FIG. 10A, a rim portion 58a of has a peripheral edge 60 being rounded off. A reference numeral 59a designates a contact face. In FIG. 10B, a rim portion 68a has an outer ring-shaped face 70 disposed about a contact face 69a. The outer ring-shaped face 70 is conical, and inclined in a direction opposite to that of the contact face 69a. In FIG. 10C, a rim portion 78a has an outer ring-shaped face 80 disposed about a contact face 79a. The outer ring-shaped face 80 is flat, and parallel with the reference plane L1.

In the above embodiments, the inclination angle θ of the inclined contact faces 9a and 9b satisfies 5°≦θ≦50°. However, the inclination angle θ may satisfy θ>0°, because the inclined contact faces 9a and 9b with the inclination angle θ slightly smaller than 5° may be barely usable.

In the above embodiments, the length L of the inclined contact faces 9a and 9b satisfies 0.15 mm≦L≦0.8 mm. However, the length L may be set a little greater than 0.8 mm, because the inclined contact faces 9a and 9b with the length L slightly greater than 0.8 mm may be barely usable.

Figure 11A:
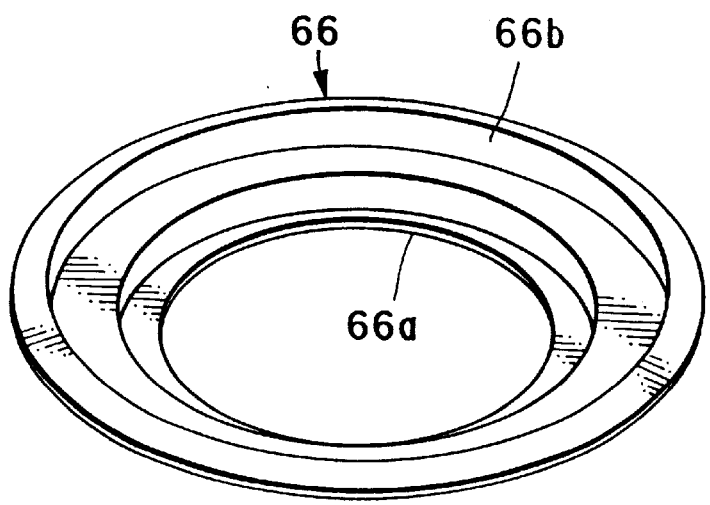
FIG. 11A is a perspective illustrating another preferred flange having support projections.

In FIGS. 11A–13C, still another preferred embodiment is illustrated, including support projections 66c and 67c. In FIGS. 11A and 12A, flanges 66 and 67 have a two-stepped cup shape. The flanges 66 and 67 have respective holes 66a and 67a, into which a spool core is inserted. Circumferential lips 66b and 67b wrap ends of the roll of photo film, to transmit rotation of the spool core to the outer turns of the roll, and also to keep the photo film from being loosened inside a photo film cassette. The flanges 66 and 67 are respectively molded from nylon-modified polyphenyl ether resin with which carbon black is mixed, as sufficiently soft plastic material easily deformable in the course of advance of the photo film. Each of the flanges 66 and 67 has a weight of 0.5 gram or less, and an average thickness of 0.4 mm or less. Preferably the flanges 66 and 67 have a weight of 0.01 gram or more.

Figure 11B:
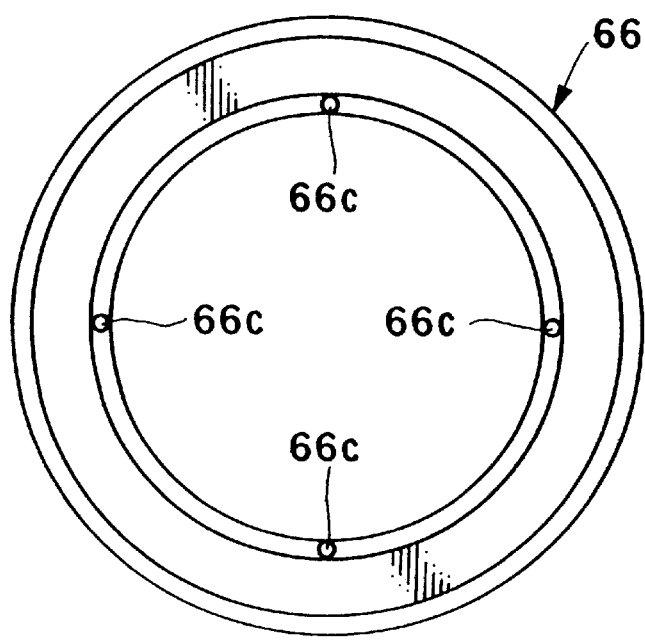
Fig. 11B is a plan illustrating the flange of FIG. 11A.
Figure 13A:
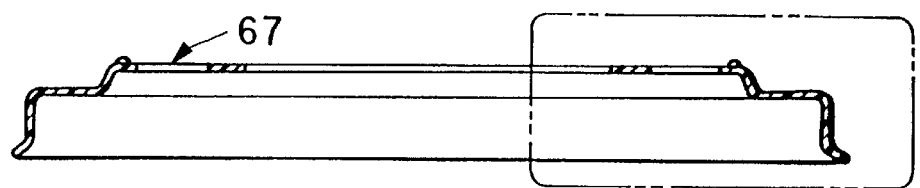
FIG. 13A is an explanatory view in cross section, illustrating the flange of FIGS. 12A an 12B.
Figure 13B:
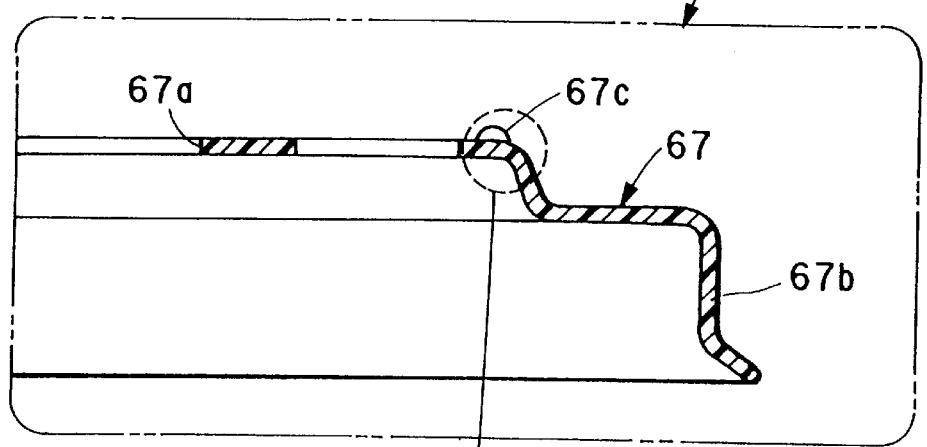
FIG. 13B is an explanatory view in enlargement, illustrating the flange with a circumferential lip.
Figure 13C:
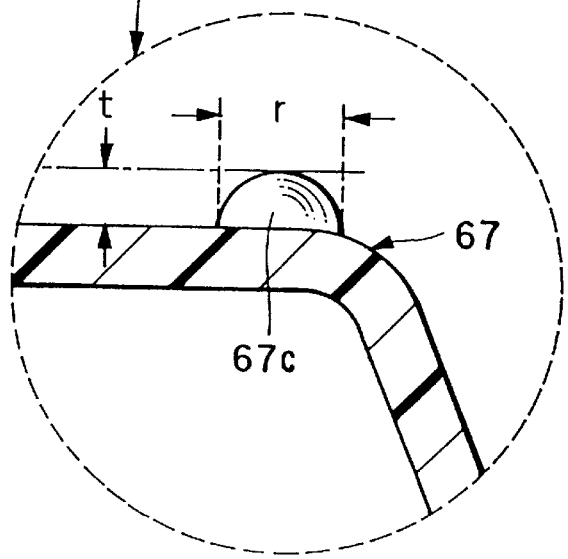
FIG. 13C is an explanatory view in enlargement, illustrating one of the support projections.
Figure 14A:
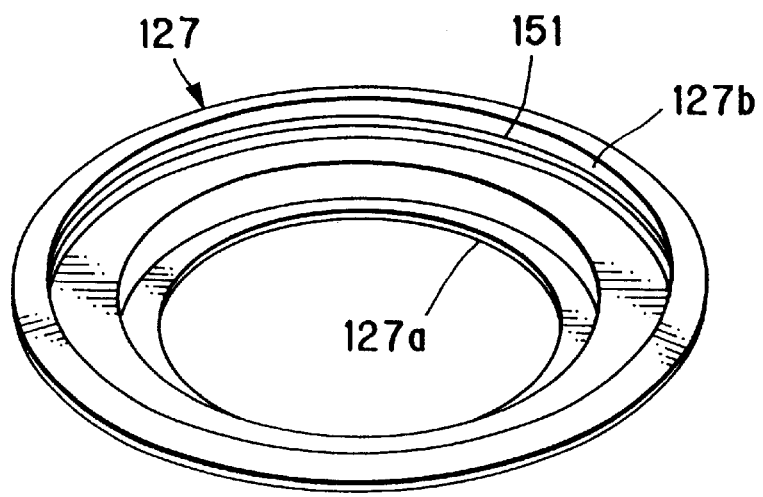
FIG. 14A is a perspective illustrating still another preferred flange having an inner ridge.
Figure 14B:
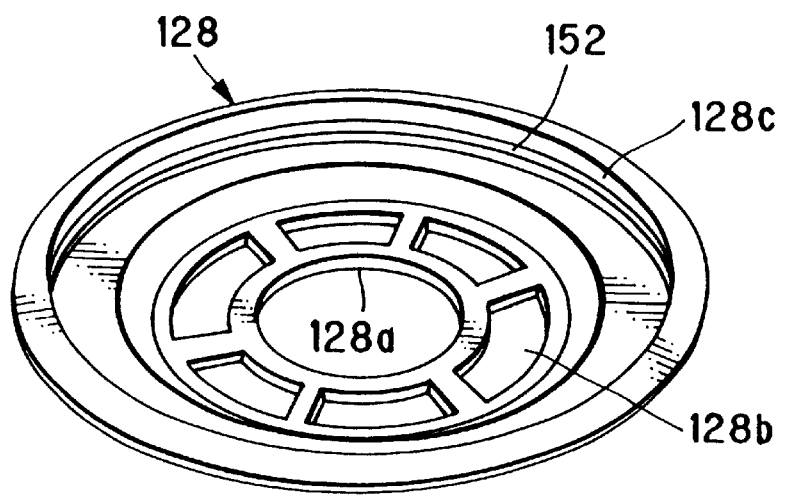
FIG. 14B is a perspective illustrating a flange opposite to that of FIG. 14B.
Figure 15A:
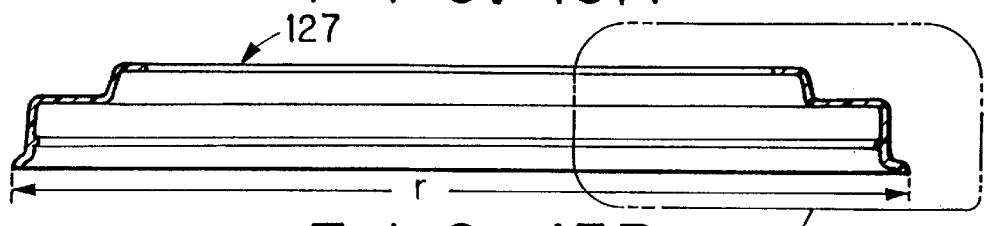
FIG. 15A is an explanatory view in cross section, illustrating the flange of FIG. 14A.
Figure 15B:
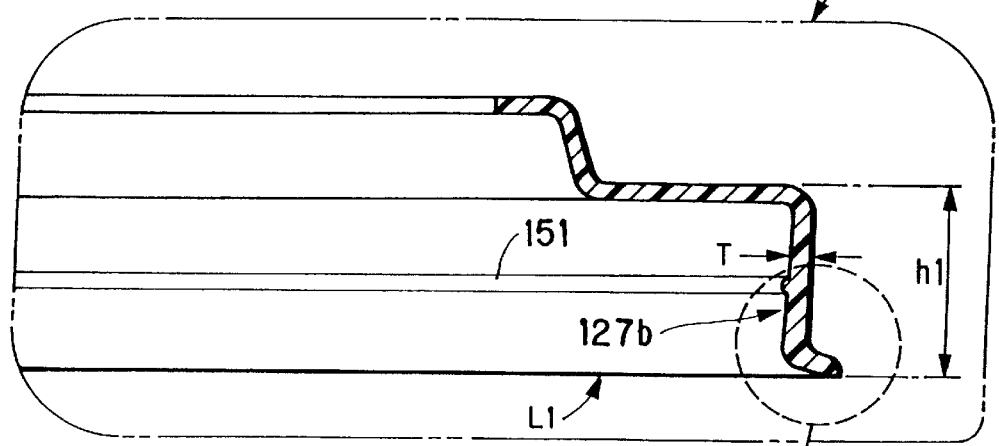
FIG. 15B is an explanatory view in enlargement, illustrating the flange with a circumferential lip.
Figure 15C:
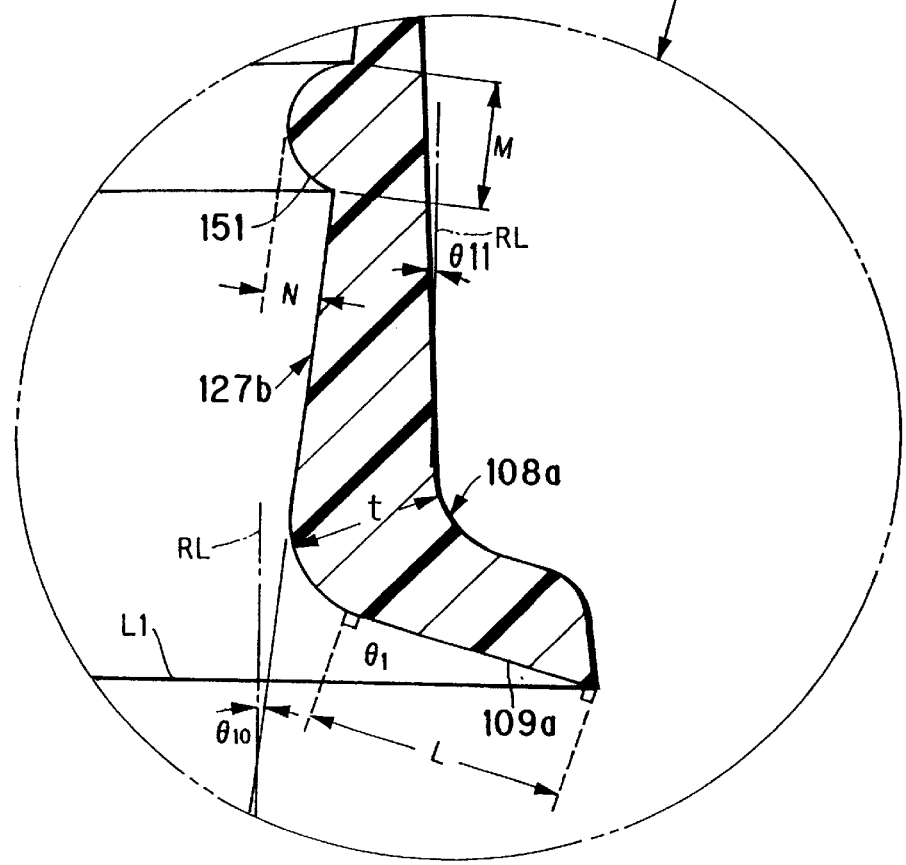
FIG. 15C is an explanatory view in enlargement, illustrating the circumferential lip with the inner ridge.

In FIGS. 11B and 12B, the support projections 66c and 67c are formed on the flanges 66 and 67 in positions on their bottom. In FIG. 13C, the support projections 67c of the flange 67 are semi-spherical, and has a height t of 0.02 mm, and a diameter r of 0.15 mm. The support projections 66c of the flange 66 have the same dimension as the support projections 67c of the flange 67. The support projections 66c and 67c are effective in reducing an area of the contact between the conveying path and the bottom surface of the flanges 66 and 67 in the course of conveyance by use of a part feeder to be described later. The conveyance of the flanges 66 and 67 is prevented from being influenced by the electrostatic charge.

The flanges 66 and 67 as a molded product are respectively conveyed and supplied by a part feeder. The conveyance and supply of the flange 67 are the same as those of the flange 66. Only the flange 66 is herein described. A part feeder is constructed to regularize a great number of the flanges 66, and transfers them to an assembly line. The part feeder is constituted by a bowl feeder and a conveying path connected with an exit of the bowl feeder.

The bowl feeder includes a bowl and a box-shaped support. A great number of flanges 66 are randomly poured into the bowl. A vibrator mechanism (not shown) is contained in the box-shaped support, and separates the flanges 66 from one another. A rotating mechanism (not shown) rotates the flanges 66 in one rotational direction, and causes them to advance through the conveying path.

The conveying path consists of a passageway which is shaped like a channel as viewed in the cross section, and causes the flanges 66 to be moved in an aligned manner one after another. The conveying path extends from the bowl feeder to an assembly line for the photo film cassette.

In the assembly line, each one of the flanges 66 from the conveying path is picked up by an actuator, and is caused to receive insertion of the spool core moving through the assembly line, to be combined with the spool core.

The conveying operation of the part feeder is described. In the process before combining the spool core with the flange 66, the bowl feeder is filled with a great number of flanges 66. The flanges 66 have been packaged in a bag in a randomly collective manner. An operator opens the bag and pours the flanges 66 into the bowl feeder. In the pouring operation, the flanges 66 are rubbed on one another to cause occurrence of electrostatic charge. The flanges 66, which are thin and light, are attracted to one another by the charge, and come to overlie on one another.

The bowl feeder causes the flanges 66 to rotate and vibrate. The flanges 66 are gradually regularized in one direction and aligned. The flanges 66 move along a spiral rail inside the bowl, and exit through the conveying path in the aligned state. In FIG. 11B, the support projections 66c are so formed on the flange 66 that the contact area between the conveying path and the flange 66 is reduced. Thus failure in the conveyance is avoided, as no electrostatic charge attracts the flanges 66 to one another, or overlays the flanges 66 in an inseparable manner.

Note that the number of the support projections 66c and 67c is changeable, and can be determined to represent information of a mold cavity used for forming the flanges 66 and 67. For example, five different flanges A–E are formed discernibly in the shape. The flange A, as viewed in the bottom plan, has two support projections located in its top. The flange B has two support projections located in its top and one support projection located in its bottom. The flange C has two support projections located in its top and one support projection located in its right. The flange D has two support projections located in its top, one support projection located in its bottom, and one support projection located in its right. The flange E has two support projections located in its top, one support projection located in its bottom, one support projection located in its left, and one support projection located in its right. Even the single mold has plural cavities, each of the flanges can be discriminated as to which cavities the flanges has been produced from. This is effective in monitoring the quality of each of the cavities. The quality of the flanges can be checked easily.

It is to be noted that structures different from the semi-spherical support projections may be used for the purpose of reducing the contact area. A flange can have a ring-shaped ridge of a small width on its bottom, to form a step on the bottom. Also a flange can have four arc-shaped ridges respectively between adjacent two of ratchet holes.

EXAMPLES

The effectiveness of the flange in relation to the electric charge is described now. Examples of the flexible flanges are conditioned as follows:

Material: nylon-modified polyphenylene ether;

Electrification characteristic: volume resistivity of $10^{16}$–$10^{17}$ (Ω·m);

Temperature of the air: 20° C.;
Humidity of the air: 35%;
Frequency of the vibration: 50–100 Hz;
Range of displacement in the vibration: 0.1–0.5 mm.

A first example is a flange having an average thickness of 0.2 mm, and a step of 0.02 mm. A bottom area of the flange is 63 mm². An area of the bottom in the contact with the conveying path is 5 mm². The contact area coefficient S (%) is determined as a ratio of the area Q mm² of the bottom in the contact with the conveying path to the whole bottom area g mm². As the weight of the flange is 46 mg, the contact area coefficient S (%) is $5/63 \times 100 = 8(\%)$. Therefore the weight per unit area is 9.2 mg/mm². In the experiment, the plural flanges of this condition were poured into the part feeder. The part supply coefficient became 150% per unit time when 10 minutes lapsed after the start. The voltage of electrification was 0 kV both before the start and upon the lapse of 10 minutes. Note that an electrostatic charge measuring device manufactured by Shimuko Co. was used for the measurement of the voltage of electrification.

A second example is a flange having an average thickness of 0.2 mm, and regularly arranged 12 semi-spherical support projections, each of which has a height of 0.02 mm, and a diameter of 0.15 mm. A bottom area of the flange is 12.8 mm². An area of the bottom in the contact with the conveying path is extremely as small as 0 mm². Assume that six semi spherical support projections among the twelve have been collapsed. Let each flange have a weight of 40 mg. Then the contact area coefficient S (%) is 55%. Therefore the weight per unit area is 4.2 mg/mm². In the experiment, the plural flanges of this condition were poured into the part feeder. The part supply coefficient became 150% per unit time when 10 minutes lapsed after the start. The voltage of electrification was 0 kV both before the start and upon the lapse of 10 minutes. Note that an electrostatic charge measuring device manufactured by Shimuko Co. was used for the measurement of the voltage of electrification.

In conclusion, the flanges according to the present invention made it possible for the part feeder to supply it without being influenced by electrostatic charge even with the humidity of 40% or less. The change in the part supply amount due to changes in the humidity was reduced, to stabilize the supply of the flanges.

In FIGS. 14A–16C, another preferred embodiment is illustrated, in which moldability of the flange is improved. A flange 128 of FIG. 14B has holes 128b to be engaged with ratchet claws. The holes 128b are arranged in a circular manner. The holes 128b are an even number, for example six, in view of engagement with the ratchet claws. It is preferable that short radial segments defined between the holes 128b are numerous and thick, for the purpose of facilitating flow of resin in the course of injection molding with an extremely small thickness. In contrast the size of the holes 128b should be great enough to receive the ratchet claws. However the greatness is inconsistent to the greatness of the short radial segments, and thus to the ease in molding of resin. Accordingly the six holes 128b are the most preferable, as the holes 128b have a length equal to or 1.2 times as much as that of the ratchet claws in the rotational direction. The changes in rigidity of the flange 128 in the course of one rotation are reduced in comparison with a four-holed flange. Noise in the rotation is reduced, to suppress creation of resin powder.

In FIGS. 14A and 15A–15C, there is a ridge 151 formed with an inner surface of a circumferential lip 127b of a flange 127. The ridge 151 is semi-circular as viewed in cross section. The ridge 151 has a foot width M projecting from the inner surface of the circumferential lip 127b in a range of 0.1–0.3 mm, a projecting height N of 0.005–0.10 mm, and a radius of a cross-section arc in a range of 0.1–0.3 mm. The inner surface of the circumferential lip 127b of the flange 127 is inclined inwards in a range of $1° \leq \theta 10 \leq 10°$ with respect to an axial direction RL of a spool core, or the rotational axis of the shape of the flange 127. The outer surface of the circumferential lip 127b is parallel to the axial direction, or inclined outwards in a range of $\theta 11 \leq 5°$.

The periphery of the circumferential lip 127b of the flange 127 has a rim portion 108a which extends to an outside of the flange with an inclination. An inclination angle θ1 of the rim portion 108a is 5–50°, more preferably 10–35° with reference to a line L1 passing opposite ends of the circumferential lip 127b. A conical surface 109a is formed on the rim portion 108a to contact the photo film. A length of the conical surface 109a is 0.15–0.8 mm, more preferably 0.2–0.5 mm.

The circumferential lip 127b of the flange 127 has a thickness T of 0.15 mm or more, preferably 0.16 mm or more. The rim portion 108a has a thickness t of 0.13 mm or more, preferably 0.14 mm or more. A projecting height hi of the circumferential lip 127b is 1.15–1.35 mm, preferably 1.20–1.30 mm. The flange 127 has an average thickness of 0.1–0.3 mm, more preferably 0.15–0.20 mm, and has a diameter r of 18–30 mm.

In FIG. 14B and 16A–16C, there is a ridge 152 formed with an inner surface of a circumferential lip 128c. The ridge 152 is semi-circular as viewed in cross section. The ridge 152 has a foot width M projecting from the inner surface of the circumferential lip 127b in a range of 0.1–0.3 mm, a projecting height N of 0.005–0.10 mm, and a radius of a cross-section arc in a range of 0.1–0.3 mm. The inner surface of the circumferential lip 128c of the flange 128 is inclined in a range of 1–10° with respect to an axial direction of the spool core. The outer surface of the circumferential lip 128c is parallel to the axial direction, or inclined outwards in a range of 5° or less.

Figure 16A:
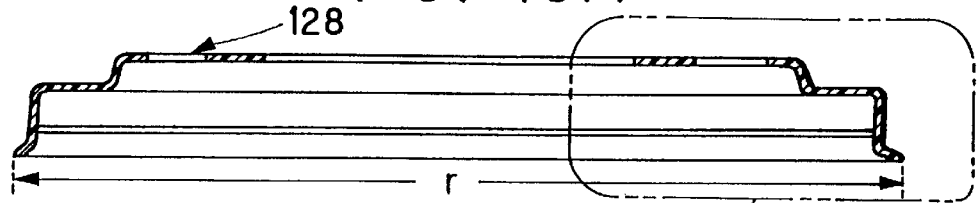
FIG. 16A–16C are explanatory views illustrating the flange of FIG. 14B including the circumferential lip and the inner ridge.
Figure 16B:
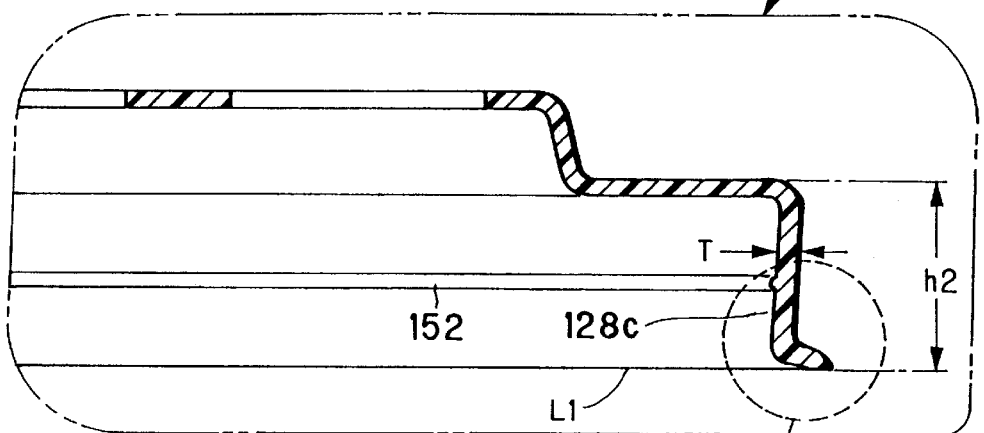
Figure 16C:
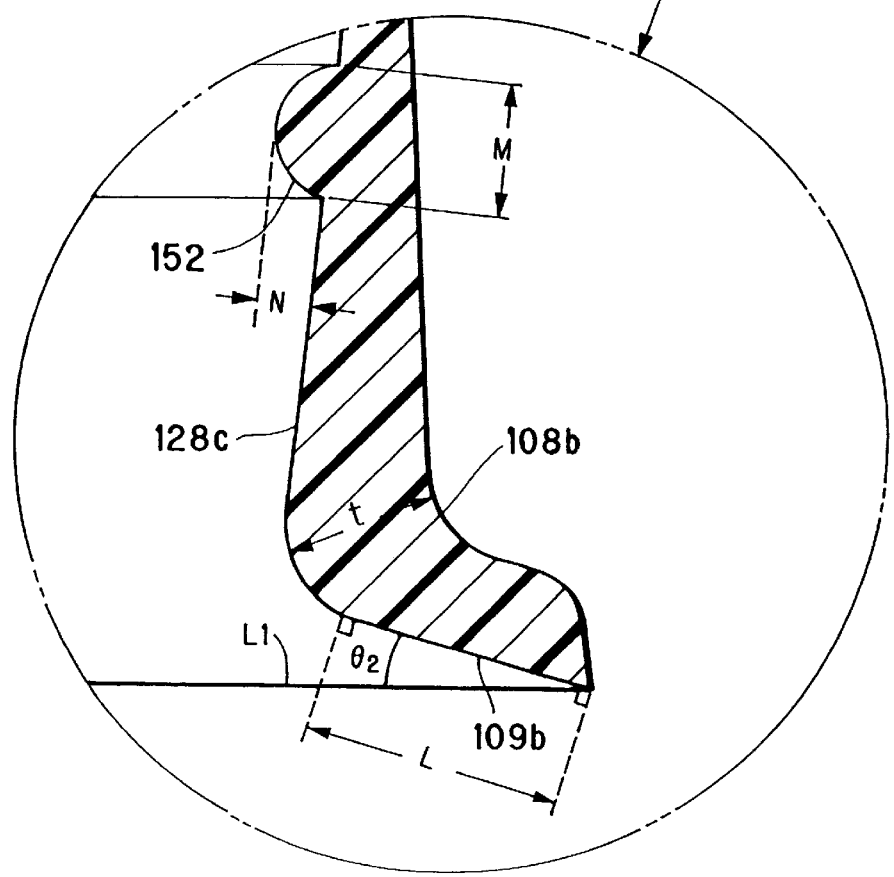

In FIGS. 16A–16C, the periphery of the circumferential lip 128c of the flange 128 has a rim portion 108b which extends to an outside of the flange with an inclination. An inclination angle θ2 of the rim portion 108b is 5–50°, more preferably 10–35° with reference to a line L1 passing opposite ends of the circumferential lip 128c. A conical surface 109b is formed on the rim portion 108b to contact the photo film. A length L of the conical surface 109b is 0.15–0.8 mm, more preferably 0.2–0.5 mm.

The circumferential lip 128c of the flange 128 has a thickness T of 0.15 mm or more, preferably 0.16 mm or more. The rim portion 108b has a thickness t of 0.13 mm or more, preferably 0.14 mm or more. A projecting height h2 of the circumferential lip 128c is 1.30–1.50 mm, preferably 1.35–1.45 mm. The flange 128 has an average thickness of 0.1–0.3 mm, more preferably 0.15–0.20 mm, and has a diameter r of 18–30 mm.

The flanges 127 and 128 are formed by an injection molding apparatus known in the art. The injection molding apparatus (not shown) is constituted by an injection unit and a mold unit. The injection unit kneads resin to be molded for injection. The mold unit is constituted by a mold set and a mold shifter mechanism. The mold set includes a movable mold and a stationary mold. The mold shifter mechanism moves the movable mold up and down.

In the mold set, there are guide pins in its side positions to extend in parallel with one another. The mold shifter mechanism move the movable mold in a direction along the guide pins. It is possible to use a family mold set in which the flanges 127 and 128 of the two kinds can be molded at the same time. For this family mold set, a three-plate type is preferable, which is constituted by a stationary mold, an intermediate mold and a movable mold. A sprue, a runner and a gate are disposed between the stationary mold and the intermediate mold. A flange or molded product is obtained between the intermediate mold and the movable mold.

A gate is formed in the center of the stationary mold for pouring melted resin into the mold set. An end of a runner lock pin appears at a cold-slug well of the movable mold. The runner lock pin is a release mechanism for the molded product. When the movable mold starts being opened, the runner lock pin pulls the molded flange. When the movable mold opens entirely, the runner lock pin pushes out the flange. Note that a knockout pin may be used instead of the runner lock pin for knocking the flange. The molded flange has a runner formed with resin in the gate. The runner is cut away by a punching machine in a position of a disk gate, to form a hole 127a. Similarly a runner is cut away from the flange 128 to form a hole 128a. It is to be noted that the runner cutting may be effected inside the mold set immediately after the molding.

The ridges 151 and 152 being formed, the flanges 127 and 128 are solidified in the course of the molding of the mold unit in a state where the ridges 151 and 152 are captured in associated partial cavities in the movable mold. After the molding, the mold shifter mechanism moves up the movable mold away from the stationary mold to open the mold set. The flanges 127 and 128 remain on the movable mold while keeping the captured state of the ridges 151 and 152 in the partial cavities in the movable mold.

When the mold set opens, the flanges 127 and 128 i nevitably remain on the movable mold where the runner lock pin is disposed. It is possible to mold the flanges 127 and 128 consecutively in a stably automated manner without much time after releasing the flanges 127 and 128 before injection for the next time. There occurs no problem of remaining the flanges 127 and 128 on the stationary mold which does not have a releasing mechanism.

To ensure the consecutive operation of molding, it is also preferable instead of the ridge to form a groove in an inner surface of a circumferential lip of a flange. In molding operation, the flange is solidified in a state where the groove is engaged with a partial core on a mold for forming the groove. The flange remains on the movable mold. Thus it is reliably possible to mold flanges consecutively.

The groove in the flange has a preferable depth S of 0.01–0.05 mm, and a preferable width M of 0.1–0.3 mm.

It is also to be noted that the ridge or the groove in the present invention may be formed in a continual manner, in which plural shorter ridges or grooves are arranged with gaps in a circular manner. Furthermore the ridges or grooves may be formed in two or more lines.

To ensure the consecutive operation of molding, it is also preferable instead of the ridge to form a rough surface in an inner surface of a circumferential lip of a flange. In molding operation, the flange is solidified in a state where the rough surface is engaged with a corresponding surface on a mold for forming the rough surface. The flange remains on the movable mold. Thus it is reliably possible to mold flanges consecutively.

Roughness of the rough surface on the flange is in a preferable range of 5–30 μm. The rough surface is formed in a preferable width which is equal to or more than 0.1 mm, and equal to or less than a projecting height of the circumferential lip.

The flanges 127 and 128 are formed by injection molding. The injection speed of the injection molding is 300–1,500 mm per second, preferably 400–1,000 mm per second. In the injection molding, a range of resin temperature is 260–320°C. A range of mold temperature is 60–120° C.

The flanges 127 and 128 are formed from nylon-modified polyphenylene ether. There are various types of nylon-modified polyphenylene ether as polymer alloy. Examples of this in the present invention are polymer alloys formed polyphenylene ether and one selected from among polycaprolactam (nylon 6), polyhexamethylene adipamide (nylon 66) and polylaurin lactam (nylon 12).

To the nylon-modified polyphenylene ether, silicone is added in a range of 0.5–3.0 wt. %, preferably 0.8–2.3 wt. %. Carbon black is also added in a range of 0.01–3.0 wt. %. Should the silicone be less than 0.5 wt. %, there is no effect of lubricity. Should the silicone be more than 3.0 wt. %, the resin cannot be kneaded sufficiently, as a screw of a kneader slips with the resin.

EXAMPLES

Examples of flanges for the photo film cassette are described. In the following, a term "Step height" represents a projecting height of the circumferential lip, "A-flange" represents the first flange, and "B-flange" represents the second flange.

[Example 1] the ridges 151 and 152 formed on the lip inner surface;
  arc-shaped as viewed in section;
  continuous in a rotational direction;
  width M of the ridge foot: 0.1–0.3 mm;
  radius R of the ridges: 0.1–0.3 mm;
  height N of the ridges: 0.01–0.05 mm;
  position of the ridges: a central position of the lip inner surface.

[Example 2] the groove formed in the lip inner surface;
  semi-circular or arc-shaped as viewed in section;
  allowably triangular or trapezoidal;
  continuous or intermittent in the rotational direction.
  width of the groove foot: 0.1–0.3 mm;
  radius R of an inner shape of the groove: 0.1–0.3 mm;
  depth of the groove: 0.01–0.05 mm;
  position of the groove: a central position of the lip inner surface.

[Example 3] the rough surface on the lip inner surface;
  roughness of the rough surface: 15–25 μm;
  width of the rough surface: 0.3–1.2 mm;
  preferably continuous in the rotational direction, and allowably continual with gaps;
  position of the rough surface: position without contact between the lip inner surface and the photo film in the state of winding the photo film.

As a result of experiments, the flange of a parallel shape was obtained without deformation in its top and middle step by the virtue of the ridge, the groove or the rough surface.

Evaluation and comparison were made between a photo film cassette incorporating this flange, and one incorporating a comparative flange, which had been deformed by knocking out and had the "Step height" apparently increased by approximately 5%.

Two kinds of the flanges different in the "Step height" were placed in the photo film cassette, and evaluated. In the A-flange, the "Step height" was 1.25 mm. In the B-flange, the "Step height" was 1.40 mm. The average thickness was 0.17 mm. The thickness of corner portions was about 0.15 mm.

Among the comparative deformed flanges, the A-flange had the "Step height" of 1.32 mm. The B-flange had the "Step height" of 1.47 mm. They had the thickness equal to that of the novel flange without deformation.

In the evaluation of the performance, the resistance to the advance of the photo film was reduced by approximately 20%, from 60 grams to 50 grams. Noise in the rewinding operation of the photo film into the cassette shell was reduced from 72 dB to 68 dB, as measured at a distance of 15 cm.

A ridge on the lip inner surface resulted in higher intensity, and higher force for pinching the photo film. The force for advancing the photo film was increased. As the outer surface of the photo film was supported by the ridge, the photo film edges did not contact the lip inner surface. The photo film edges were effectively protected. There was little influence to performance of photo film. Performance of the photo film cassette was raised in total.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film cassette comprising:

a spool core about which a photo film is wound; and a first flange secured to said spool core;

wherein said first flange includes (a) a first lip wrapping around a lateral edge of an outer-most turn of said photo film, wherein said first lip has an inner surface that confronts a major surface of said photo film; and (b) at least one ridge disposed on said inner surface and projecting toward said photo film.

2. A photo film cassette as defined in claim 1, wherein said first lip has an outer surface that faces away from said photo film; and during molding of said first flange from resin, said at least one ridge sets a release of said inner surface later than a release of said outer surface.

3. A photo film cassette as defined in claim 1, wherein said first flange has an average thickness of 0.1–3.0 mm, and a diameter of 18–30 mm.

4. A photo film cassette as defined in claim 1, comprising:

a second flange secured to said spool core such that said photo film is interposed between said first and said second flanges;

wherein said second flange includes a second lip;

said first lip has a projecting length of 1.15–1.35 mm;

said second lip has a projecting length of 1.30–1.50 mm;

said inner surface of said first lip and an inner surface of said second lip are inclined at an angle of 1–10 degrees to decrease a radius thereof toward an outside edge thereof;

respective outer surfaces of said first and said second lips extend one of substantially erectly, and inclined at an angle of at most 5 degrees to increase a radius thereof toward said outside edge thereof.

5. A photo film cassette as defined in claim 1, wherein said at least one ridge is arc-shaped as viewed in section, and extends in a ring shape in a circular direction of said inner surface.

6. A photo film cassette as defined in claim 1, wherein a projecting height of said at least one ridge is 0.005–0.10 mm.

7. A photo film cassette as defined in claim 1, further comprising:

a second flange secured to said spool core such that said photo film is interposed between said first and said second flanges;

wherein said first and said second flanges are formed by injection molding with resin temperature of 260–320° C., with mold temperature of 60–120° C., and injection speed of 300–1,500 mm per second.

* * * * *